(12) United States Patent
Nordt et al.

(10) Patent No.: US 9,268,339 B2
(45) Date of Patent: Feb. 23, 2016

(54) HYDRAULIC VALVE ARRANGEMENT

(71) Applicant: Robert Bosch GmbH, Stuttgart (DE)

(72) Inventors: Friedemann Nordt, Eutingen (DE); Carola Diebold, Eutingen (DE); Dieter Lohmiller, Haigerloch (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 14/057,305

(22) Filed: Oct. 18, 2013

(65) Prior Publication Data

US 2014/0109989 A1  Apr. 24, 2014

(30) Foreign Application Priority Data

Oct. 19, 2012  (DE) .......... 10 2012 020 630

(51) Int. Cl.
  *G05D 16/00* (2006.01)
  *G05D 7/00* (2006.01)
  *F16K 31/122* (2006.01)
  *F16K 31/363* (2006.01)
  *F16K 27/04* (2006.01)

(52) U.S. Cl.
  CPC .............. *G05D 16/00* (2013.01); *F16K 27/041* (2013.01); *F16K 31/1225* (2013.01); *F16K 31/363* (2013.01); *G05D 7/00* (2013.01); *F15B 2211/20553* (2013.01); *Y10T 137/598* (2015.04)

(58) Field of Classification Search
  CPC ........ G05D 7/00; G05D 16/00; F16K 27/041; F16K 31/363; F16K 31/1225; F15B 2211/20533; Y10T 137/598
  See application file for complete search history.

(56) References Cited

U.S. PATENT DOCUMENTS

| 4,777,980 A | * | 10/1988 | Warhurst et al. | 137/625.69 |
| 7,555,899 B2 | * | 7/2009 | Maier et al. | 60/452 |
| 2006/0157116 A1 | * | 7/2006 | Martin et al. | 137/514.5 |
| 2006/0249703 A1 | * | 11/2006 | Gilbert et al. | 251/337 |

FOREIGN PATENT DOCUMENTS

| DE | 10 2009 052 076 A1 | 5/2011 |
| DE | 10 2010 048 068 A1 | 10/2011 |

* cited by examiner

*Primary Examiner* — Craig Schneider
*Assistant Examiner* — Kevin Barss
(74) *Attorney, Agent, or Firm* — Maginot, Moore & Beck LLP

(57) ABSTRACT

A hydraulic valve arrangement, in particular a control valve arrangement of an axial piston machine, includes at least two valves that have springs supported in each case on a spring seat. The two spring seats are connected to one another with a material-to-material fit in one or more of a non-positive manner and a positively locking manner.

14 Claims, 5 Drawing Sheets

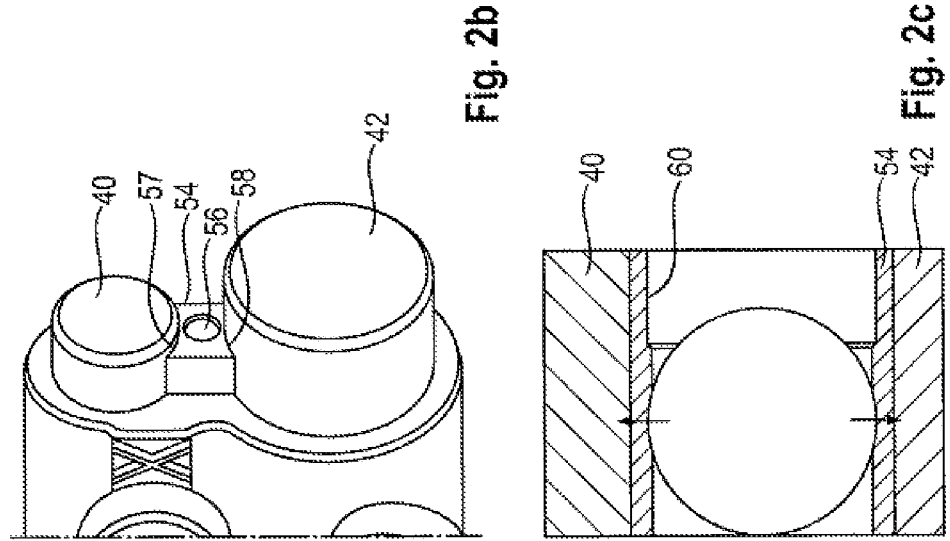
Fig. 2b
Fig. 2c
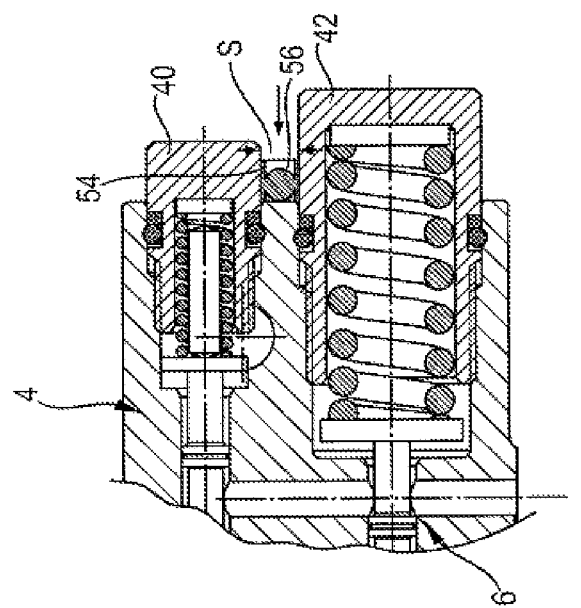
Fig. 2a

HYDRAULIC VALVE ARRANGEMENT

This application claims priority under 35 U.S.C. §119 to patent application no. DE 10 2012 020 630.5, filed on Oct. 19, 2012 in Germany, the disclosure of which is incorporated herein by reference in its entirety.

BACKGROUND

The disclosure relates to a hydraulic valve arrangement, for example for controlling the pressure and volumetric flow of an axial piston machine.

A hydraulic valve arrangement of this type is known from DE 10 2010 048 068 A1 and has a valve housing, in which a pressure control valve and a delivery-flow control valve of an axial piston pump are arranged in an axially parallel manner. Each of said control valves has a valve body which is guided in a valve bore and via which a pressure medium connection between a pressure connector which is loaded with the pump pressure (system pressure) and a tank connector or a control connector can be opened and closed, with the result that a pressure space of an actuating cylinder is loaded correspondingly with the system pressure or the tank pressure. The valve bodies of the delivery-flow control valve and the pressure control valve are loaded in each case via a control spring in a direction, in which the pressure space is connected to the tank and the pressure medium connection between the control connector and the pressure connector which conducts the system pressure is shut off. The control behavior of the two control valves can be set by setting and adjusting of the spring prestress of the two control springs.

In the known solution, each control spring is supported indirectly or directly on a setting screw which is in threaded engagement with the valve housing, with the result that the spring prestress can be varied by screwing in or screwing out the setting screw. The adjustment is performed at the factory, the setting screw then being braced with a lock nut in order to fix the preset value. Both the head of the setting screw and the lock nut are configured with a hexagon socket, the hexagon socket on the lock-nut side being configured as a passage opening, through which the tool for adjusting the setting screw can be attached. Both the head of the setting screw and the lock nut are arranged countersunk in a receiving bore of the housing, with the result that accidental adjustment is made more difficult.

DE 10 2010 048 068 A1 which is mentioned above and DE 10 2009 052 076 A1 disclose a solution, in which the spring seat is not configured as a setting screw, but rather is configured by an expander. An expander of this type has an expanding sleeve, into which an expanding element is inserted, by way of the axial displacement of which the expanding sleeve is calked to the housing or the like.

All these solutions have the common disadvantage that a comparatively large number of structural elements are required, in order to set the spring prestress and to secure the spring seat against adjustment.

A further disadvantage consists in that the valve arrangement has to be configured with a correspondingly larger overall length as a result of the required structural elements, for example the setting screw and the lock nut or the expander.

In contrast, the disclosure is based on the object of providing a valve arrangement, in which the spring prestress can be set and fixed with low outlay, a small amount of installation space and few parts.

SUMMARY

This object is achieved by way of a hydraulic valve arrangement having the features of the disclosure.

Advantageous developments of the disclosure are the subject matter of the subclaims.

According to the disclosure, the hydraulic valve arrangement has a valve housing, in which at least two valves are arranged. Each of said valves has a valve bore, in which a valve body is guided which is prestressed in one direction via a spring arrangement. The spring arrangement is supported for its part on a spring seat which is in threaded engagement with an element which is fixed to the housing. The relative positioning of the two valves is such that the spring seats/setting screws thereof protrude in sections out of the housing at a small axial spacing or are at least accessible. The securing against adjustment takes place via a securing element which is arranged at least in sections in the gap or the space between the two spring seats and secures or connects both spring seats with a material-to-material fit, in a non-positive manner and/or in a positively locking manner.

The solution according to the disclosure digresses from the previously realized concept, in which each spring seat is secured by a dedicated securing element (lock nut, expander), since a securing element is used which, in a double function, secures both spring seats against rotation.

In a solution which can be produced very simply, said securing element is configured by way of a welded seam, via which the two spring seats are welded to one another.

In a solution of this type, for example in the case in which the spring seat or spring seats is/are not produced from a material which is optimized for welding, a welding ring or the like can be placed onto the corresponding region of the spring seat, which welding ring simplifies the welding to the other spring seat or to a corresponding welding ring which is placed onto the other spring seat. It is preferred here if said welding ring is for its part connected fixedly to the respective spring seat so as to rotate with it.

Said welding ring is preferably produced from a material which is optimized for welding.

As an alternative, the securing element can be configured as a clamping element. Said clamping element can be configured, in one variant of the disclosure, in such a way that it is calked to one of the circumferential face sections of the spring seat which lie opposite.

The calking by means of the clamping element is simplified if the latter is configured with a recess, into which a calking body can be driven for calking purposes. That is to say, the clamping element is configured as a type of expander in this solution.

In a further variant of the disclosure, the clamping element is of wedge-shaped configuration at least in sections. The two spring seats are configured with corresponding wedge faces, along which the wedge is driven in, in order to transmit the clamping force to the two spring seats.

In a further variant of the disclosure, the clamping element is configured in two pieces from two clamping pieces of mushroom-like configuration which can be connected along their narrow sides in such a way that they penetrate the gap between the spring seats transversely with respect to the spring axis, the widened end sections of the clamping pieces being operatively connected to in each case one spring seat in a positively locking or non-positive manner.

The positioning of said clamping piece is simplified if the widened end sections of the clamping piece parts in each case dip into a recess of the relevant spring seat.

In a further exemplary embodiment, the securing element is configured by a wire or the like which wraps around the spring seats in sections and secures this relative rotation.

Said wire can in each case penetrate a bore of the spring seat.

For rough setting of the spring prestress, the spring seat can be configured with a spacer disk or the like.

In one preferred exemplary embodiment of the disclosure, one valve of the valve arrangement is a pressure control valve and the other valve is a delivery-flow control valve of a hydraulic machine.

BRIEF DESCRIPTION OF THE DRAWINGS

Preferred exemplary embodiments of the disclosure will be explained in greater detail in the following text using diagrammatic drawings, in which:

FIGS. 2a, 2b, 2c show views of a further exemplary embodiment, in which the spring seats are calked by means of a clamping piece.

DETAILED DESCRIPTION

Figure 1:
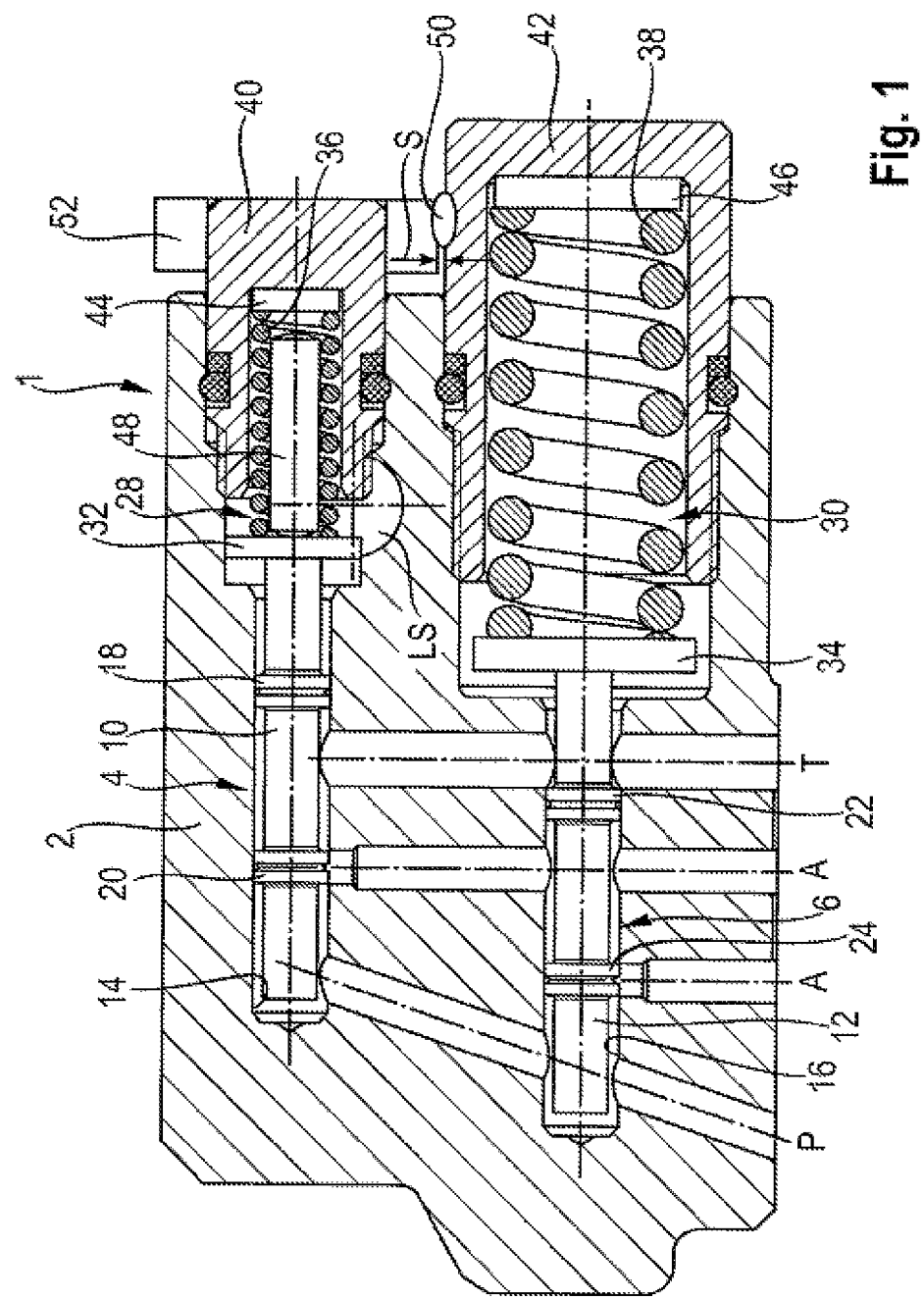
FIG. 1 shows a control valve arrangement having a pressure control valve and a delivery-flow control valve with welded valve seats.

FIG. 1 shows a longitudinal section through a valve arrangement which, in the exemplary embodiment which is shown, serves as control valve arrangement 1 for controlling the pressure and delivery flow of an axial piston pump. As was explained at the outset, the control of the pressure and delivery flow of an axial piston pump takes place by way of adjustment of a pivot cradle/swash plate by means of an actuating cylinder, the pressure chamber of which, which acts in the adjusting direction, can be loaded via the control valve arrangement with tank pressure or the system pressure, preferably the pressure at the outlet of the pump. With regard to further details of an adjusting device of this type of an axial piston pump, reference is to be made by way of example to DE 10 2010 048 068 A1 (see here, in particular, FIG. 6 and the associated description) which was cited at the outset and the disclosure in this regard of which is to be added to that of the present application. The control valve arrangement 1 which is described in the following text can be embodied as an insertion cartridge, can be integrated directly into a pump housing or can be attached to the latter.

FIG. 1 shows a variant, in which the control valve arrangement 1 is received in a housing 2. In the latter, a delivery-flow control valve 4 and a pressure control valve 6 are arranged parallel to one another. A pressure connector P which is connected to the pressure connector of the pump, two outlet connectors A which are connected to the pressure space of the actuating cylinder and a tank connector T are configured on the housing 2. Furthermore, the delivery-flow control valve has a load-pressure connector LS which conducts the highest load pressure of the system. Each of the control valves has a control piston 10, 12 which are shown in their control position in FIG. 1. The control piston 10 of the delivery-flow control valve 4 is guided in a valve bore 14, into which three channels open which are connected to the pressure connector P, to the tank connector T and to the outlet connector A on the right-hand side in FIG. 1. The control piston 12 is guided in a valve bore 16 which is likewise connected to the pressure connector P, the outlet connector A which is on the left-hand side in FIG. 1, and the tank connector T.

Both control pistons 10, 12 have in each case two control collars 18, 20 and 22, 24, respectively. The control piston 10 is prestressed in the direction of a basic position via a control spring arrangement 28 and the load pressure which acts in the spring space and is tapped off at the connector LS (not shown in FIG. 1), in which basic position the control piston 10 bears with its end face against the bottom of the valve bore 14. In said basic position, the pressure medium connection between the outlet connector A and the pressure connector P is shut off via the control collar 20, and the pressure medium connection between the outlet connector A and the tank connector T is opened, with the result that the pressure space of the actuating cylinder is relieved of pressure. By way of the pressure at the connector P which acts on the end side of the control piston 10, said control piston 10 can be displaced counter to the force of the spring arrangement 28 beyond the control position which is shown and in which then the pressure medium connection between the working connector A and the tank connector T is closed and the pressure medium connection from the pressure connector P to the working connector A is opened, with the result that the pressure space is loaded with the pump pressure, in order, for example, to pivot the pivot cradle back out of its pivoted position in the direction of a reduction in the delivery volumetric flow.

In a corresponding way, the control piston 12 of the pressure control valve 6 is prestressed by means of a control spring arrangement 30 in the direction of a basic position, in which correspondingly the end side of the control piston 12 bears against the bottom of the valve bore 16 and the pressure medium connection between the connectors A and T is opened and the pressure medium connection between the pressure connector P and the outlet connector A is closed.

Both control spring arrangements 28, 30 act in each case on a radial collar 32, 34 of the respective control piston 10, 12. Here, each spring arrangement 28, 30 has a control spring 36, 38 which for its part is supported on a spring seat, in the present case a setting screw 40, 42. To this end, said setting screw 40, 42 is configured as a sleeve which is closed on one side and is in threaded engagement with an external thread by way of a part of the respective valve bore 14, 16, which part is enlarged in the radial direction. The spring prestress of the control springs 36, 38 which are supported there can be changed accordingly by screwing in or screwing out of the respective setting screw 40, 42. For rough setting, a spacer disk 44, 46 which is supported on the respective inner end face of the relevant setting screw 40, 42 is inserted into the setting screw 40, 42. In the exemplary embodiment which is shown, end sections of the setting screw 40, 42 project out of the end face of the housing 2. In principle, said setting screws can also be countersunk in one or more recesses of the housing 2. In addition, a cover for the setting screws 40, 42 can also be attached.

FIG. 1 does not show devices of the setting screws 40, 42, to which in each case one tool for adjustment can be attached. Said device can be, for example, an external polygon or a polygon socket or the like.

In the exemplary embodiment which is shown in FIG. 1, the control spring arrangement 28 of the delivery-flow control valve 4 is configured with a cylinder pin 48 which limits the maximum stroke of the control piston 10. Said cylinder pin 48 bears against the radial collar 32 and is engaged around by a section of the control spring 36.

In order to adjust the control range, the setting screw 40, 42 is adjusted at the factory and is then secured. In the exemplary embodiment which is shown, said securing takes place by way of a welded joint/welded seam 50 which produces a material-to-material connection between the two setting screws 40, 42, with the result that they can no longer be rotated. Since setting screws 40, 42 are as a rule not optimized with regard to the welding capability, a welding ring 52 can be placed onto the setting screw 40, as indicated at the top in FIG. 1. This positioning can take place by way of pressing, soldering, adhesive bonding, a positively locking connection or any other way. The material of the welding ring 52 is optimized with regard to the welding capability. It can be seen in FIG. 1, furthermore, that, as a result of the positioning of the welding ring 52 on the setting screw 40, the gap S between the outer circumference of the welding ring 52 and the opposite outer circumferential section of the setting screw 42 is reduced considerably in comparison with the dimension without welding ring 52, with the result that a comparatively small, compact welded seam 50 can be formed with a minimum heat input. Instead of said welded joint, it goes without saying that another suitable material-to-material connection can also take place, for example soldering, adhesive bonding or the like.

FIGS. 2a to 2c shows a variant, in which the positional fixing of the two setting screws 40, 42 after the adjusting does not take place with a material-to-material fit but rather substantially in a non-positive manner. To this end, a clamping element 54 is inserted into the gap S between the two setting screws 40, 42 which are arranged in parallel, and said clamping element 44 is then calked with the adjacent circumferential sections of the setting screws 40, 42 by a calking body 54 being driven in. According to the three-dimensional illustration in FIG. 2b, in the bearing region with the setting screws 40, 42, the clamping element 54 has a hollow channel 57, 58, the contour of which is adapted to that of the setting screw 40, 42, with the result that contact takes place as far as possible over the full surface area. In order to increase the clamping/frictional forces, the bearing regions of the clamping element 54 and/or of the setting screw 40, 42 can be structured. In the exemplary embodiment which is shown, the calking body 56 is a ball (see FIG. 2c) which is driven into a calking bore 60 of the clamping element 54, with the result that said clamping element 54 is widened in the arrow direction and is therefore calked to the setting screw 40, 42 in a non-positive/positively locking manner. After said calking, an adjustment of the setting screws 40, 42 is not possible without releasing the calked connection.

Figure 3:
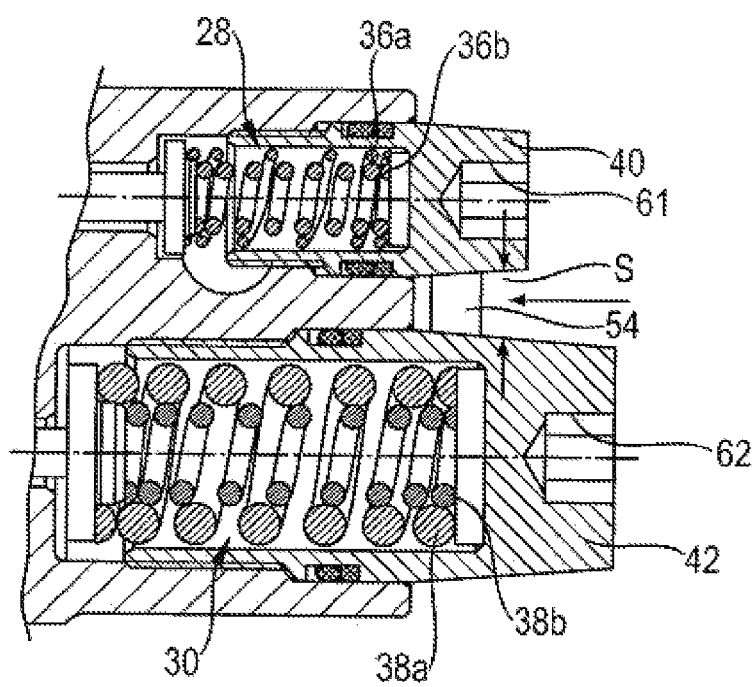
FIG. 3 shows a variant of a control valve arrangement, in which the spring seats are calked by means of a wedge.

FIG. 3 shows a variant of the exemplary embodiment according to FIGS. 2a to 2c. In this exemplary embodiment, the control spring arrangements 28, 30 are configured in each case by two control springs 36a, 36b and 38a, 38b, respectively, which are nested in one another and the spring rates of which are added (connection in parallel). Furthermore, the outer circumferential faces of the two setting screws 40, 42 are set obliquely with respect to the respective control axis, at least in the region of the gap S, with the result that said gap S tapers toward the control spring arrangement 28, 30 in the illustration according to FIG. 3. A wedge-shaped clamping element 54 is then inserted into said tapering gap/space, the wedge angle of which clamping element 54 corresponds to the setting angles of the circumferential sections of the setting screws 40, 42, with the result that they can be calked to one another by driving of the wedge 54 into the space S. Said bearing faces can then also again be provided with a structuring, in order to prevent accidental release of the wedge. Other means, such as an adhesive or the like, can also be used for securing purposes. In this variant, the two setting screws 40, 42 are also secured against rotation by way of a non-positive/positively locking connection. The illustration according to FIG. 3 also shows hexagon sockets 61, 63 of the spring seats 40, 42, to which in each case one suitable tool for adjustment can be attached—as has been explained, the clamping element 54 is then driven in following said adjustment.

Figure 4A:
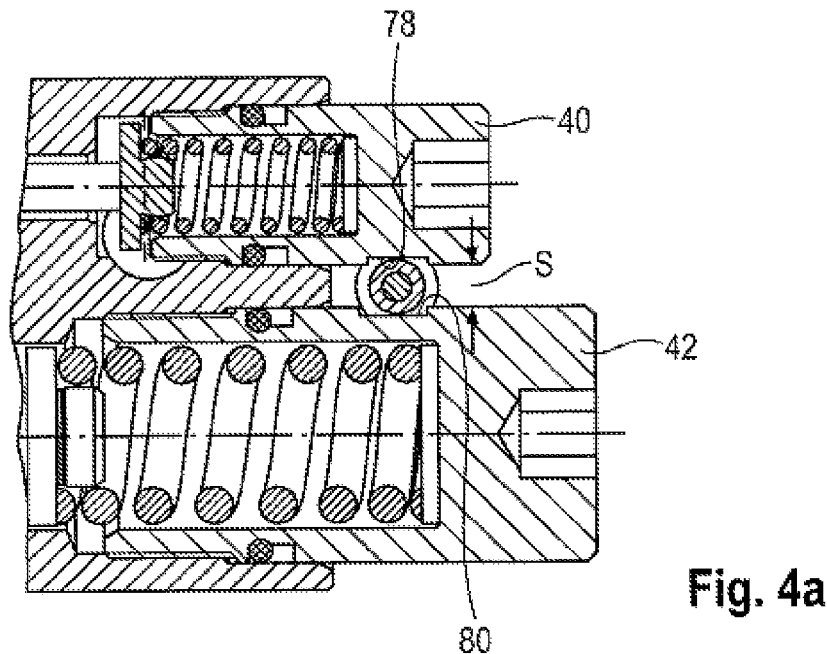
FIGS. 4a, 4b show views of an exemplary embodiment, in which the clamping piece is inserted transversely with respect to the spring longitudinal axis.
Figure 4B:
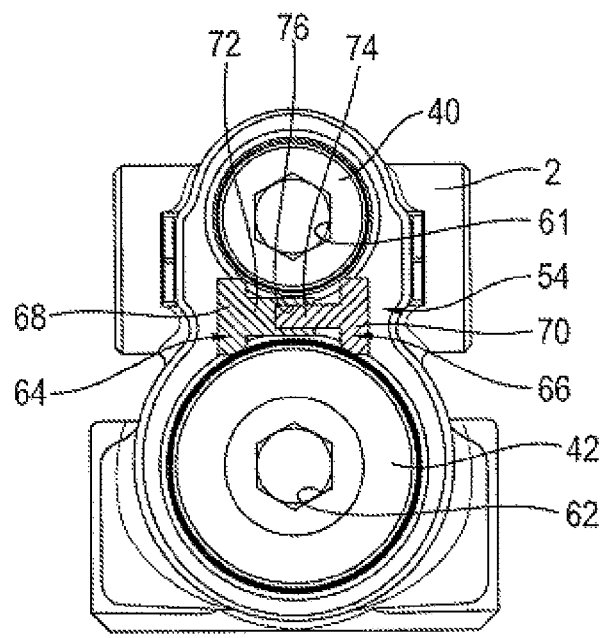

FIGS. 4a, 4b show a further variant of the above-described concept. In this variant, a clamping element 54 is inserted into the gap S transversely, that is to say perpendicularly with respect to the plane of the drawing, in order to connect the two setting screws 40, 42 to one another in a non-positive/positively locking manner. According to the sectioned side view in FIG. 4b, in which the end faces of the setting screws 40, 42 which are screwed into the housing 2 can be seen with the respective hexagon sockets 61, 63, said clamping element 54 is configured in two pieces with two clamping pieces 64, 66 of mushroom-like configuration. In the illustration according to FIG. 4b, each of said clamping pieces 64, 66 has a first approximation of a mushroom-shaped structure with an end section which is widened in the radial direction and a pin 72, 74 which is reduced in the radial direction in contrast. The pin 72 of the clamping piece 64 is configured with a recess 76, the diameter of which corresponds to that of the narrow pin 74 of the clamping piece 66, with the result that it can be driven into the recess 76 with an interference fit. Accordingly, for calking purposes, the two clamping pieces 64, 66 are inserted into the gap S perpendicularly with respect to the plane of the drawing in FIG. 4a and are then connected to one another frictionally or by means of a thread or the like, at least circumferential regions of the end sections 68, 70 then coming into clamping contact with the outer circumference of the setting screws 40, 42. In order to optimize this calking, in each case one groove 78, 80 can be made on the outer circumference of the setting screws 40, 42, in which groove 78, 80 the pin 72 with a greater diameter is then arranged. In this way, the actual gap S can be selected to be relatively small, since space is provided for the pins 70, 72 via the grooves 78, 80. The end sections 68, 70 which are widened in the radial direction likewise dip in sections into said grooves 78, 80, with the result that the calking is improved.

Figure 5:
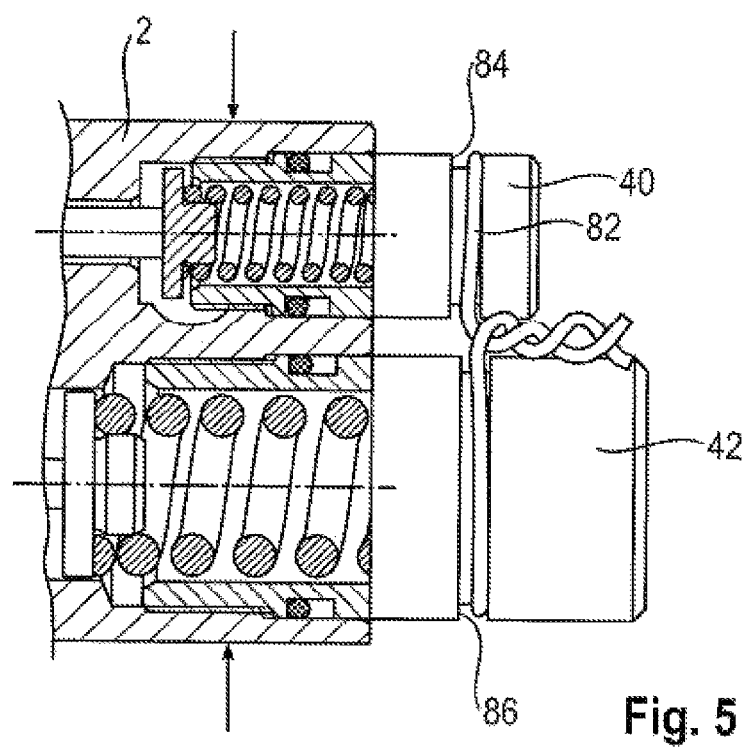
FIG. 5 shows an exemplary embodiment of a control valve arrangement, in which the spring seats are fixed positionally by means of a wire.

FIG. 5 shows a variant of particularly simple construction, in which the two setting screws 40, 42 are secured via a wire 82. Here, as in the exemplary embodiment according to FIG. 5, in each case one circumferential annular groove 84, 86 can be configured on the outer circumference of the setting screws 40, 42, into which circumferential annular groove 84, 86 the wire 82 is inserted in sections, the wire routing being effected in such a way that it engages around the two setting screws 40, 42 approximately in a figure of eight. The securing can be improved further if both setting screws 40, 42 are embodied with transverse bores, through which the wire 82 can be threaded. The two wire ends are twisted with one another, with the result that accidental release of the setting screws 40, 42 is not possible in practice.

In an exemplary embodiment of very simple configuration, instead of the above-described securing means, calking can also take place by virtue of the fact that, as indicated in FIG. 5, a calking force is applied to the housing circumference in the arrow direction, with the result that the housing 2 is calked to the respective setting screw 40, 42. That is to say, in this case, the housing 2 acts as it were as a clamping element, via which the two setting screws 40, 42 are connected to one another in a non-positive and positively locking manner. This connection is particularly secure if the calking takes place in the region of the two threads, along which the setting screws 40, 42 are in threaded engagement with the housing 2.

A hydraulic valve arrangement is disclosed, in particular a control valve arrangement of an axial piston machine having at least two valves, the springs of which are supported in each case on a spring seat. According to the disclosure, the two spring seats are connected to one another with a material-to-material fit, in a non-positive manner or in a positively locking manner.

What is claimed is:

1. A hydraulic valve arrangement, comprising:
   a valve housing;
   at least two valves, each of the at least two valves respectively including a valve bore defined in the valve housing, a valve body positioned in the valve bore, the valve bore being configured to guide the valve body, a spring arrangement configured to prestress the valve body in one direction, a spring seat configured to support the spring arrangement, the spring seat being in threaded engagement with an element fixed to the valve housing, the spring seat having an end section; and
   a securing mechanism including a securing element arranged at least in sections in a gap between the end section of the spring seat of one of the at least two valves and the end section of the spring seat of another of the at least two valves, the securing mechanism configured to secure the spring seats together with a material-to-material fit in one or more of a non-positive manner and a positively locking manner.

2. The valve arrangement according to claim 1, wherein the securing element is a welded joint.

3. The valve arrangement according to claim 2, wherein a welding ring is placed onto the spring seat of at least one of the at least two valves.

4. The valve arrangement according to claim 3, wherein the spring seat of each of the at least two valves and/or the welding ring is composed of a weldable material.

5. The valve arrangement according to claim 1, wherein the securing element is a clamping element.

6. The valve arrangement according to claim 5, wherein circumferential face sections of the clamping element are calked with the spring seats of each of the at least two valves.

7. The valve arrangement according to claim 6, wherein the clamping element has a calking bore into which a calking body is driven to calk the clamping element with the spring seats of each of the at least two valves.

8. The valve arrangement according to claim 5, wherein the clamping element is a wedge, the spring seats of each of the at least two valves have correspondingly configured wedge faces along which the wedge bears in order to apply a clamping force.

9. The valve arrangement according to claim 8, wherein the clamping element is configured in two pieces with two clamping pieces of mushroom-like configuration that are configured to be connected along their narrow sides such that they penetrate the gap between the spring seats of each of the at least two valves transversely with respect to the valve axis, the clamping pieces having widened end sections operatively connected to the respective spring seat of each of the at least two valves in a non-positive/positively locking manner.

10. The valve arrangement according to claim 9, wherein each of the clamping pieces dips into a recess of the respective spring seat of each of the at least two valves.

11. The valve arrangement according to claim 1, wherein the securing element is a wire configured to wrap around the spring seats of each of the at least two valves at least in sections and secure the spring seats of each of the at least two valves against relative rotation.

12. The valve arrangement according to claim 11, wherein the wire penetrates an annular groove or a bore of the spring seat of each of the at least two valves.

13. The valve arrangement according to claim 1, wherein the spring seat of each of the at least two valves is configured with a spacer disk configured to roughly set the spring stress of the spring arrangement of each of the at least two valves.

14. The valve arrangement according to claim 1, wherein one of the at least two valves is a pressure control valve and another of the at least two valves is a delivery-flow control valve of a hydraulic machine.

* * * * *